Sept. 22, 1925.
W. E. HOLLAND
BATTERY CELL CLOSURE
Filed May 19, 1921
1,554,727
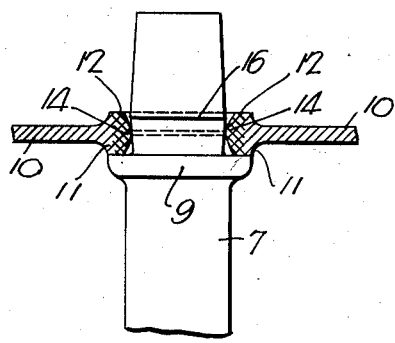
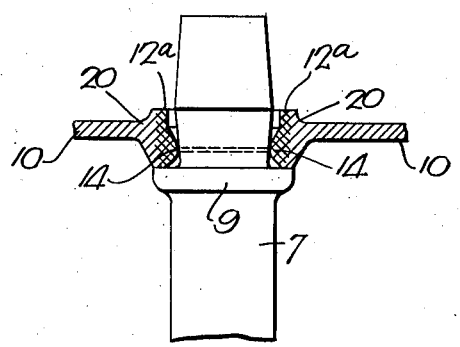
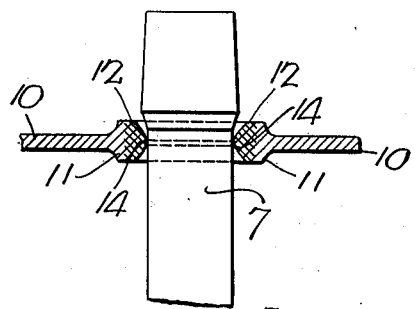
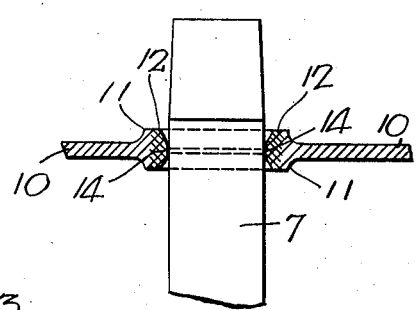
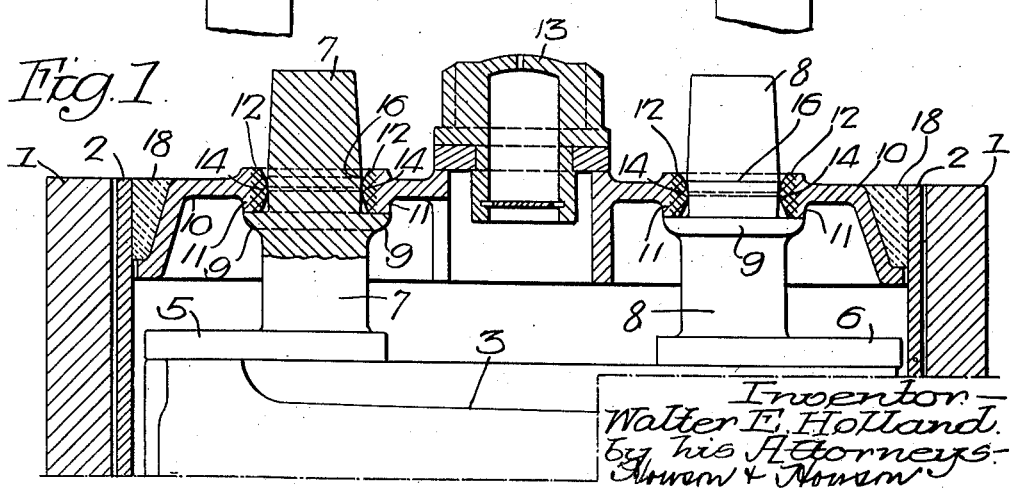
Inventor—
Walter E. Holland.
by his Attorneys Patented Sept. 22, 1925.

1,554,727

UNITED STATES PATENT OFFICE.

WALTER E. HOLLAND, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

BATTERY-CELL CLOSURE.

Application filed May 19, 1921. Serial No. 470,843.

*To all whom it may concern:*

Be it known that I, WALTER E. HOLLAND, a citizen of the United States, residing in Philadelphia, Pennsylvania, have invented Battery-Cell Closures, of which the following is a specification.

One object of my invention is to provide a simple, inexpensive and relatively flexible joint or sealing connection particularly adapted for use between the terminal posts of a storage battery or other electrolytic cell and the cover thereof, and the invention more especially contemplates an improved combination of parts which may be quickly assembled or separated without injury to each other and without the use of tools.

I further desire to provide a joint or connection of the character indicated which shall not work loose, which shall be capable of absorbing or cushioning shocks, vibrations or the like, and which shall consequently serve to prevent cracking or other injury to the sealing compound between the cover and the container which it closes, as well as any injury to the plates and other internal parts.

These objects and other advantageous ends I attain as hereinafter set forth, reference being had to the accompanying drawings, in which, Fig. 1 is an elevation partly in vertical section, taken through the terminal posts of a storage battery cell and illustrating my invention as applied thereto; and Figs. 2 to 5 inclusive are fragmentary vertical sections illustrating various forms of the invention.

In the above drawings, 1 represents a case or tray in which is mounted a suitable jar 2 of hard rubber or other suitable material containing two sets of battery plates of which one is shown at 3 and these are respectively connected metallic straps 5 and 6. Projecting up from and formed integral with these straps respectively are two terminal posts 7 and 8, each of which, in accordance with that form of my invention shown in Figs. 1 and 2, is provided with an annular and preferably integral flange or collar 9 supporting the cell cover 10. This latter is formed with annular flanges 11 around openings for the terminal posts 7 and 8. Between these openings is a filling opening having a vented cap or closure 13 to permit escape of gas.

Each of the post openings has its internal portion or edge thickened as indicated at 12, and whereas the body or main portion of the cover 10 is made of hard rubber or similar rigid material, the annular portions 12 surrounding the post openings are made of resilient material such as soft rubber. The latter, however, is integral with the body of the cover and the construction of the whole is such that there is an imperceptible gradation in composition from the soft-rubber portion 12 to the adjacent portions of the hard-rubber body 10, so that there is no defined joint between these parts and therefore no liability of leakage between them. It is to be noted that the portions 12 are angular in cross section, so that each of them has an annular rib or bead projecting inwardly substantially within the plane of the cover body 10.

That portion of each post above the flange 9 is preferably formed with an outwardly projecting annular rib 16 so positioned that when the lower flange of the compression section 12 of the cover rests upon the post flange 9, the part of greatest diameter of said rib lies above the plane of least diameter of said portion 12 as defined by its inwardly projecting rib or bead 14. Moreover the diameter of the opening through the latter is such that after the cover has been forced over the upper end of the terminal post, it will spring into and closely fit the neck of the latter below its rib 16, conforming closely to the shape of the post.

When in the course of assembling the battery cell the cover 10 is placed over the terminal posts 7 and 8, each of these enters one of the compression sections 12, and as said cover is forced downwardly, the soft-rubber beads or ribs 14 are sprung outward until finally they pass over the rigid beads or ribs 16, after which further downward movement of the cover is prevented by the lower flanges of the compression portions 12 coming into engagement with the shoulders or flanges 9 of the terminal posts.

The minimum diameter of the opening defined by each of the cover ribs 14 bears such a relation to the diameter of the post ribs 16 that, when the parts are assembled as shown in Fig. 1, liquid-tight joints are formed between the cover and the terminal posts, due to the resilient sections 14 being maintained in compression against the relatively hard surface of the posts, so that the escape of electrolyte is effectually prevented. At the same time, owing to the resilience of these sections, any vibration or movement of the relatively heavy internal parts of the cell with reference to the external parts is prevented from doing injury to any of said parts and from breaking the joint formed by the sealing compound 18 between said cover and the upper part of the jar 2.

When the parts shown in Fig. 1 are being assembled, it is obvious that the soft-rubber portions 14 of the compression sections 12 are compressed and their diameter enlarged in order to allow passage of the portions of greater diameter of the respective terminal posts. In order to facilitate the assembling and to avoid the possibility of injury to said ribs 14 from excessive pressure, I may in some instances employ the construction shown in Fig. 3, wherein the plane of the rib 14 is below the plane of the adjacent portion of the cover body 20. In such case the section 12$^a$ and the rib 14 are made wholly or partly of soft or pliable rubber and being extended below the level of the cover body the rib 14 is not held so rigidly and therefore less force is required to mount the cover on the terminal posts than in the former case.

In certain types of cell, where for example the cover rests directly upon the top edge of the battery jar, it is not necessary or desirable to provide the terminal posts with the flanges or shoulders 9 and these are therefore omitted. In such case the posts are preferably formed as before with annular ribs or beads 16 below which they are made cylindrical and of a diameter less than that of said rib, so that the ribs 14 of the compression portions 12 of the cover may engage and form a liquid-tight seal at any level along the cylindrical portions.

In some cases, as shown in Fig. 5, the part of each post below its rib may preferably be of the same diameter as the latter, while its upper end as before is preferably though not necessarily tapered. With any of the constructions shown it is ordinarily advantageous to use a lubricant, such as glycerine or soap solution, which will not harm the soft rubber or other parts, to facilitate the mounting of the cover on the posts. Also, if desired, the cover may be expanded by heating before forcing it down on the posts.

With the constructions illustrated it will be noted that even though the plate groups of the battery cell should be vibrated or moved violently relatively to the cover and jar, the resulting blows or shocks would be largely absorbed by the resilient sections 12, thus protecting the parts from injury. Moreover, an effective liquid-tight joint is made between the posts and the cover without the use of structurally separate gaskets, sealing compound or other means, and obviously no tools are required either to place the cover in position on the posts or to remove it therefrom.

While under conditions of use the cover is effectively held in place, it is easily possible, after the plate elements and cover have been withdrawn from the jar, to manually remove said cover from the posts by pressing on the latter with the thumbs and at the same time pulling on the edges of the cover with the fingers.

I claim:

1. A battery cell cover having a post opening formed with an integral flange of greater thickness than the surrounding portion of the cover, said flange including an integral inwardly projecting annular portion of relatively pliable material.

2. A battery cell cover having at least one opening formed with an integral flange of greater thickness than the surrounding portion of the cover, said flange including an inwardly projecting pliable annular rib lying in a plane below the plane of the body of the cover.

3. The combination in a battery cell of a post formed with shoulders; and a cover having an opening for the post formed with a pliable integral edge section whose internal diameter is less than the external diameter of that part of the post between the shoulders where the edge section comes to rest when the cover is mounted.

4. The combination in a battery cell of a cover having terminal post openings therein, each formed with relatively compressbile edge sections integral with the body of said cover and cell posts extending through said openings and interlocking with said edge portions of the cover to form liquid-tight joints.

5. The combination in a battery cell of a cover having an opening formed with an integral annular rib of relatively compressible material different from that of the body of the cover; and a terminal post extending through the opening and having a second annular rib normally above the rib of the cover, the latter coacting with said post to form a liquid-tight joint.

6. The combination in a battery cell of a container; a cover of relatively hard material having openings therein formed with integral flange portions each having an inwardly extending pliable edge section; plates in the container; and terminal posts for the plates respectively extending through the cover openings and coacting with the pliable edge sections thereof to form liquid-tight joints, the cover being capable of assembly and separation by forcible movement.

7. The combination in a battery cell of a container; a cover of relatively hard material having openings therein formed with integral flange portions each having an inwardly extending pliable edge section; plates in the container; and terminal posts for the plates respectively extending through the cover openings and coacting with the pliable edge sections thereof to form liquid-tight joints, the posts being respectively formed with annular ribs above the normal level of the pliable edge sections of the cover.

8. A battery cell cover having a post opening formed with an integral inwardly projecting annular portion of relatively pliable material 9. A battery jar cover composed of hard rubber with hollow cylindrical members forming openings for the battery contact posts and soft rubber bushings formed integrally with such cover and adapted to allow such cover and openings to have a tight fit with such contact posts, each bushing being U-shaped and open at the top to receive a soft metal washer to bind the bushing firmly against the contact post.

WALTER E. HOLLAND.